United States Patent [19]

Nilssen

[11] Patent Number: 4,507,698

[45] Date of Patent: Mar. 26, 1985

[54] INVERTER-TYPE BALLAST WITH GROUND-FAULT PROTECTION

[76] Inventor: Ole K. Nilssen, Caesar Dr., Rte. 5, Barrington, Ill. 60010

[21] Appl. No.: 481,714

[22] Filed: Apr. 4, 1983

[51] Int. Cl.³ .............................................. H02H 3/16
[52] U.S. Cl. .............................. 361/42; 315/DIG. 7; 361/45; 363/56; 363/97
[58] Field of Search ........................ 361/44, 45, 46, 42, 361/49; 315/DIG. 5, DIG. 7; 363/50, 56, 97, 98

[56] References Cited

U.S. PATENT DOCUMENTS

| 3,407,337 | 10/1968 | Benham | 361/45 X |
| 3,506,906 | 4/1970 | Nestor | 361/45 |
| 4,398,126 | 8/1983 | Zuchtriegel | 315/127 |

FOREIGN PATENT DOCUMENTS 1267270  6/1960  France ............................. 361/45

*Primary Examiner*—Harry E. Moose, Jr.

[57] ABSTRACT

With most fluorescent lighting fixtures, the voltages required at the sockets to start the fluorescent lamps are so high as potentially to constitute a substantial electric shock hazard to persons having to service such fixtures. To mitigate this hazard, whenever socket voltages exceed certain levels, protective measures have to be provided.

The essential shock hazard problem associated with a fluorescent lighting fixture relates to the situation where a person, who may be in contact with earth ground, is holding onto one end of a fluorescent lamp while the other end of the lamp is inserted into its socket.

In its preferred embodiment, subject invention constitutes an electronic ballasting means for fluorescent lamps, with said ballasting means comprising an inverter operating at a frequency of about 33 kHz.

To mitigate the electric shock hazard associated with high ballast output voltages, arrangements have been provided by which just a small current flowing directly from one of the ballast output terminals to earth ground will operate to shut the inverter off.

12 Claims, 1 Drawing Figure

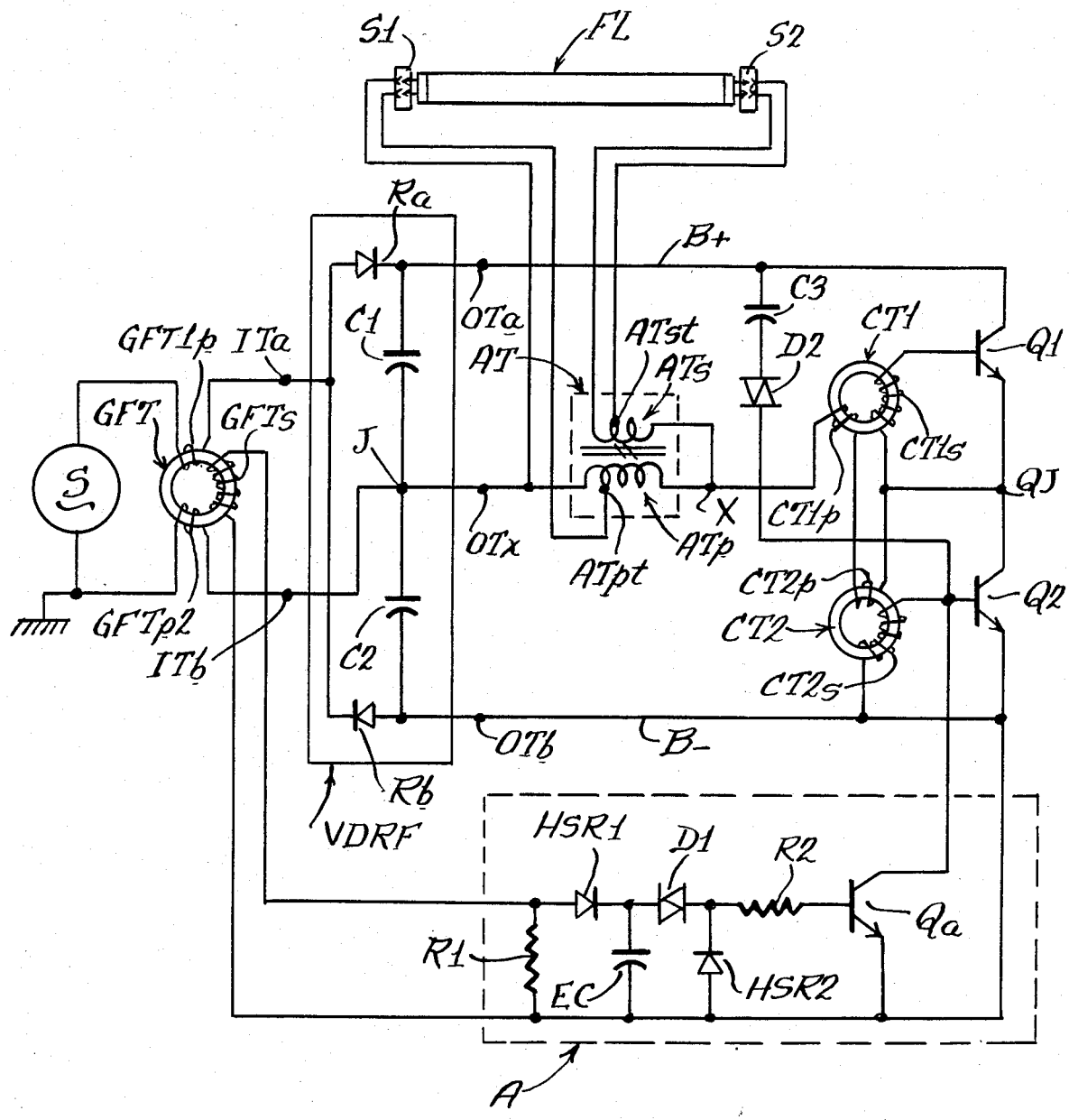

4,507,698

INVERTER-TYPE BALLAST WITH GROUND-FAULT PROTECTION

BACKGROUND OF THE INVENTION

1. Field of the Invention

The present invention relates to power-line-operated switch-mode or inverter-type power supplies with built-in means for preventing excessive ground-fault currents from flowing from the power supply output terminals.

More particularly, the invention relates to power-line-operated inverter-type fluorescent lamp ballasts of a type having built-in means for preventing excessive ground-fault currents from flowing from the ballast output terminals.

2. Description of Prior Art

Power-line-operated switch-mode or inverter-type power supplies are presently being used in a variety of applications. In particular, such power supplies are often used in connection with powering or ballasting fluorescent lamps and other gas discharge lamps.

An example of a fluorescent lamp ballast based on such a power-line-operated inverter-type power supply is provided in U.S. Pat. No. 4,277,726 entitled Solid-State Ballast For Rapid-Start Type Fluorescent Lamps and issued to Robert V. Burke.

When using such inverter-type ballasts in connection with the lamps most commonly used in fluorescent lighting fixtures, the voltages required at the sockets to start the fluorescent lamps are so high as potentially to constitute a substantial electric shock hazard to persons having to service such fixtures. To mitigate this hazard, whenever socket voltages exceed certain levels, protective measures have to be provided.

The essential shock hazard problem associated with a fluorescent lighting fixture relates to the situation where a person, who may be in contact with earth ground, is holding onto one end of a fluorescent lamp while the other end of the lamp is inserted into its socket.

Consequently, by using lamp sockets of a type that provides for disconnection of the socket voltages whenever a lamp is removed (so-called circuit-interrupting sockets), acceptably save operation will result. Alternatively, electrical isolation can be provided between earth ground and the ballast output to the lamp sockets.

In most applications of inverter-type ballasts, the resulting socket voltages are indeed high enough to require protective measures; and the only presently available commercially practicable solution (which is the solution provided for in said Burke Patent) is that of using an isolation transformer to provide electrical isolation between the power line input (which is connected with earth ground) and the ballast output to the lamp sockets. While this solution is indeed safety-wise acceptable, it involves substantial penalties in terms of ballast cost, size and weight, as well as in overall ballast efficiency.

Of course, circuit-interrupting sockets could be used; but that solution would require the use of non-standard and substantially more costly lamp sockets in addition to extensive added wiring within the fixture. Thus, the use of circuit-interrupting lamp sockets would constitute an even less attractive solution than would the use of an isolation transformer.

Another solution to the problem of electric shock hazard could involve the use of ground-fault circuit interruption means, which could be used for preventing excessive current from flowing from the ballast output terminals to earth ground.

However, at the present time, no electronic ballast with built-in means for preventing the flow of excessive ground-fault currents is presently available for purchase; nor has such a ballast been described in known published literature.

SUMMARY OF THE INVENTION

Objects of the Invention

A first object of the present invention is that of providing a power-line-operated inverter-type power supply with built-in means for removing its output voltage in case there is a substantive amount of current flowing from one of its output terminals to ground.

A second object is that of providing an inverter-type fluorescent lamp ballast with built-in means for preventing the flow of excessive current from the ballast output to ground.

A third object is that of providing a power-line-operated inverter-type fluorescent lamp ballast wherein the ballast output voltage is switched off in case there is a significant flow of ground-fault current.

A fourth object is that of providing for fluorescent lighting fixtures an electronic means for providing the function presently provided by circuit-interrupting lamp sockets.

These as well as other objects, features and advantages of the present invention will become apparent from the following description and claims.

BRIEF DESCRIPTION

In its preferred embodiment, subject invention relates to a power-line-operated inverter-type fluorescent lamp ballast that comprises means by which the ballast output voltage is shut off in cases where a significant amount of current is flowing from one of the ballast output terminals and directly to earth ground.

More particularly, this fluorescent lamp ballast comprises the following key elements:

(a) A voltage-doubling rectifier-filtering means for connecting with a regular 120 Volt/60 Hz electric power line and operative to convert the AC voltage thereon into a DC voltage of approximately 320 Volt magnitude;

(b) A self-oscillating inverter of a type that needs to be triggered into oscillation, said inverter being connected with said DC voltage and operative to provide a substantially squarewave AC output voltage of about 33 kHz frequency;

(c) An auto-transformer whose secondary winding exhibits a substantial amount of leakage inductance, thereby providing a limitation on the current available at its output;

(d) Means for connecting a fluorescent lamp in circuit with the current-limited output of said auto-transformer; and (e) Means for sensing ground-fault current and for stopping inverter oscillation in case this ground-fault current exceeds a pre-determined magnitude.

The method employed for turning off the self-oscillating inverter is that of using a transistor means operative to block the feedback in the inverter feedback loop. This transistor means is actuated by the output from a current transformer that is connected with its dual primary windings in series with the power line wires feeding the inverter ballast. In case there is a ground-fault current, this current must flow back to the ballast by way of the power line; and if that does occur, an output from the secondary winding on this current-transformer is used for actuating said transistor means into blocking the inverter feedback loop. Once inverter oscillation is stopped even for a brief period, it will not resume until power has been removed and then re-applied.

BRIEF DESCRIPTION OF THE DRAWING

FIG. 1 schematically illustrates the preferred embodiment of the invention, showing an inverter-type ballast adapted to operate an ordinary rapid-start fluorescent lamp.

DESCRIPTION OF THE PREFERRED EMBODIMENT

Description of the Drawing

In FIG. 1, a source S of 120 Volt/60 Hz voltage is applied to the input terminals ITa and ITb of voltage-doubling rectifier and filter means VDRF by way of primary windings GFTp1 and GFTp2 of ground-fault transformer GFT.

Within VDRF, one rectifier Ra is connected with its anode directly to input terminal ITa, and another rectifier Rb is connected with its cathode directly to the same input terminal ITa.

The positive terminal of an energy-storing electrolytic capacitor C1 is connected directly with the cathode of rectifier Ra; and the negative terminal of energy-storing electrolytic capacitor C2 is connected directly with the anode of rectifier Rb. The negative terminal of capacitor C1 is connected with the positive terminal of capacitor C2 at junction J; which junction is connected directly with input terminal ITb as well as with output terminal OTx of VDRF. The positive terminal of capacitor C1 is connected directly with output terminal OTa of VDRF; and the negative terminal of C2 is connected directly with output terminal OTb of VDRF.

Positive output terminal OTa of VDRF is connected directly with a B+ bus; and the negative output terminal OTb is connected directly with a B− bus.

Between the B+ and the B− bus are connected a series-combination of two transistors Q1 and Q2.

The secondary winding CT1s of positive feedback current transformer CT1 is connected directly between the base and the emitter of transistor Q1; and the secondary winding CT2s of positive feedback current transformer CT2 is connected directly between the base and the emitter of transistor Q2.

The collector of transistor Q1 is connected directly with the B+ bus; the emitter of transistor Q2 is connected directly with the B− bus; and the emitter of transistor Q1 is connected directly with the collector of transistor Q2, thereby forming junction QJ.

The series-connected primary windings CT1p and CT2p are connected directly between junction QJ and a point X; while the primary winding ATp of auto-transformer AT is connected with one of its terminals to point X and with its other terminal to output terminal OTx of VDRF. Primary winding ATp has a tap-point identified as ATpt.

Auto-transformer AT has a secondary winding ATs, which has a tap-point identified as ATst.

Secondary winding ATs is connected with one of its terminals to point X and with its other terminal to one of the terminals of lamp socket S2. Tap-point ATst is connected with the other terminal of lamp socket S2.

One terminal of lamp socket S1 is connected with output terminal OTx; the other terminal of lamp socket S1 is connected with tap-point ATpt.

A fluorescent lamp FL is connected with auto-transformer AT by way of lamp sockets S1 and S2.

The secondary winding GFTs of ground-fault transformer GFT is connected directly across a resistor R1, which resistor is connected between the B− bus and the anode of a high-speed rectifier HSR1.

The cathode of rectifier HSR1 is connected to the positive terminal of an energy-storing electrolytic capacitor EC. The negative terminal of capacitor EC is connected directly to the B− bus.

A Diac D1 is connected between the positive terminal of capacitor EC and the cathode of a high-speed rectifier HSR2. The anode of rectifier HSR2 is connected directly to the B− bus.

A resistor R2 is connected directly between the cathode of rectifier HSR2 and the base of an auxiliary transistor Qa.

The collector of transistor Qa is connected directly to the base of transistor Q2, and the emitter of transistor Qa is connected directly to the B− bus, which is also connected directly with the emitter of transistor Q2.

The combination of resistor R1, rectifier HSR1, capacitor EC, Diac D1, rectifier HFR2, resistor R2 and transistor Qa is referred to as sub-assembly A.

A capacitor C3 is connected in series with a Diac D2, and this series-combination is connected between the B+ bus and the base of transistor Q2.

DESCRIPTION OF OPERATION

The operation of the circuit of FIG. 1 is described as follows.

In FIG. 1, source S represents an ordinary 120 Volt/60 Hz electric utility power line, the voltage from which is applied—by way of the dual primary windings GFTp1 and GFTp2 of the ground-fault current transformer GFT—to the input terminals of a regular voltage doubler arrangement. This voltage doubler operates in the fashion of two oppositely poled single-wave rectifier-filter combinations; which means that the voltage provided between the common junction J (or OTx) and output terminal OTa is about +160 Volt DC; and, similarly, the voltage provided between OTx to OTb is about −160 Volt DC. Thus, since capacitors C1 and C2 are large enough to provide effective cycle-to-cycle energy storage at the 60 Hz input frequency (i.e., effective filtering), the voltage provided at the output of the voltage-doubler and rectifier-filter combination VDRF is about 320 Volt DC with a center tap at OTx.

In other words, the voltage provided between the B+ bus and the B− bus is about 320 Volt DC, which is then the voltage provided to the inverter circuit of FIG. 1.

This inverter circuit, which consists of the two series-connected switching transistors Q1 and Q2 in combination with the two positive feedback transformers CT1 and CT2, represents a self-oscillating half-bridge inverter and operates in a manner that is analogous with circuits previously described in published literature, as for instance in U.S. Pat. No. 4,184,128 entitled High Efficiency Push-Pull Inverters.

Upon application of power to the circuit, inverter oscillation is initiated by way of one or a few trigger pulses applied to the base of transistor Q2 by way of the series-combination of capacitor C3 and Diac D2. However, as soon as the B+ voltage stabilizes in magnitude, no further triggering pulses occur; and if oscillations were to cease, they would not restart except by removing and then re-applying the B+ voltage—which, of course, is equivalent to removing and then reapplying the power line voltage.

The output of the half-bridge inverter is a substantially squarewave 33 kHz AC voltage, which output is provided between point X and terminal OTx. Across this output is connected the primary winding of auto-transformer AT.

The fluorescent lamp FL is connected with this auto-transformer by way of its secondary winding. This secondary winding, being coupled relatively loosely to the primary winding, exhibits a substantial amount of leakage inductance; which leakage inductance provides for the requisite lamp current limitation.

The fluorescent lamp is of the rapid-start type, and its cathodes are heated by way of the two taps referred to as ATpt and ATst.

The essential feature of the present invention, which involves that of disabling the inverter in case there is an excessive flow of ground-fault current, is explained as follows.

If the one end of the fluorescent lamp were to be removed from the S1 socket while its other end were still in contact with the S2 socket, and if a current path were to be provided between this one end and earth ground (such as through the body of a person—as might occur during the servicing of a lighting fixture), a 33 kHz current would flow from the inverter circuit, by way of the auto-transformer secondary winding Ats and socket S2, through the lamp, through said current path (or person) and to earth ground. From earth ground, this 33 kHz current would flow to and through the electric utility power line; from this power line it would flow through one or both of the primary windings of transformer GFT, and back to the inverter circuit.

Ground-fault transformer GFT is a current transformer with two parallel or push-push primary windings. Thus, this current transformer does not respond to the push-pull action of the 60 Hz current flowing through its primaries during normal ballast operation. However, if there is a net 33 kHz push-push current flowing through either one or both of its primary windings, a 33 kHz net output current will be provided from its secondary winding GFTs.

The 33 kHz current output from the secondary winding of the ground-fault transformer is applied to a resistor R1, and the voltage developing across this resistor is a measure of the magnitude of the ground-fault current flowing.

The 33 kHz voltage across resistor R1 is rectified and the resulting current-limited DC voltage is applied to energy-storing capacitor EC; which implies that the DC voltage across EC will reach a magnitude that is equal to the peak magnitude of the voltage across R1.

The current transformation ratio of the transformer GFT and the value of R1 are chosen such that, for the expected maximum magnitude of the normally occurring inverter ground-fault current—such as commonly occurs by way of capacitive coupling between the fluorescent lamp and the fixture in which it is used—the DC voltage to which EC charges is below the voltage at which Diac D1 breaks down. This maximum magnitude of normally occurring ground-fault current is typically less than 10 milli-Ampere.

However, if for some reason—such as due to a person coming in contact with one of the "hot" lamp or socket terminals while simultaneously being in contact with earth ground—the magnitude of the ground-fault current increases much beyond the normally occurring maximum level, the voltage across capacitor EC will increase to a level at which Diac D1 breaks down.

When Diac D1 breaks down, part of the charge on capacitor EC discharges into the base of the auxiliary transistor Qa. As a result, this auxiliary transistor switches to a conductive state, thereby introducing a very low impedance shunt across the base-emitter junction of transistor Q2.

With such a very low impedance shunt present between the base and the emitter of transistor Q2, the inverter's positive feedback path is broken; and the inverter ceases to oscillate.

Once the inverter ceases to oscillate, it will not start again until a trigger pulse is applied to the base-emitter junction of transistor Q2; and, with the particular triggering arrangement shown (which arrangement consists of capacitor C3 and Diac D2) a new trigger pulse will not occur until after the B+ voltage has been removed and then re-applied.

In the circuit as actually shown in FIG. 1, once the inverter has been disabled, the charge on capacitors C1 and C2 is apt to remain for quite a long time even after the power line voltage has been removed. Thus, to permit the inverter to re-trigger, it is necessary to keep the power line voltage off for a period of time before re-applylying it—thereby giving capacitors C1 and C2 adequate time to discharge.

(To reduce the length of time that the power line voltage has to be kept off, a leakage resistor may be connected between the B+ bus and the B— bus.)

When Diac D1 breaks down and discharges into the base of transistor Qa, the magnitude of the discharge current is limited by resistor R2. As a result, the discharge current can be made to flow for a period long enough to assure that the inverter stops oscillating; yet, by keeping the value of R2 small enough, enough current is provided to make sure that transistor Qa becomes conductive enough to force the oscillations to stop.

The purpose of rectifier HSR2 is that of preventing negative voltages on the base of Q2 from affecting the trigger threshold of Diac D1.

Actual values and descriptions of the critical components of the preferred arrangement in FIG. 1 are listed as follows.

Output of Source S: 120 Volt/60 Hz;
Transformer GFT: Wound on a ferrite toroidal core (Magnetics Catalog No. OJ-41003-TC-00) with 15 turns of #30 wire for each of the primary windings, and 25 turns of #34 wire for the secondary winding;
Resistor R1: 1.2 kOhm/0.25 Watt;
Rectifier HSR1: 1N4937;
Capacitor EC: 100 uF/25 Volt/Electrolytic;
Diacs D1 and D2: General Electric ST-2;
Rectifier HSR2: 1N914;
Resistor R2: 220 hm/0.25 Watt;
Transistor Qa: Motorola 2N4401;
Rectifiers Ra and Rb: 1N4004's;
Capacitors C1 and C2: 100 uF/100 Volt Electrolytics;
Transistors Q1 and Q2: Motorola MJE13002's;
Capacitor C3 0.022 uF/500 Volt;
Transformers CT1 and CT2: Wound on Ferroxcube Toroids 213T050of 3E2A Ferrite Material with three turns of #26 wire for the primary windings and ten turns of #30 wire for the secondary windings.

The frequency of inverter oscillation associated with the component values identified above is approximately 33 kHz.

It is believed that the present invention and its several attendant advantages and features will be understood from the preceeding description. However, without departing from the spirit of the invention, changes may be made in its form and in the construction and interrelationships of its component parts, the form herein presented merely representing the preferred embodiment.

I claim:

1. In a power supply adapted to be connected with and to be powered from the relatively low frequency line voltage on a regular electric utility power line, said power supply being operable to provide at a set of output terminals a relatively high frequency AC voltage, the improvement comprising:

disable means operable on the receipt of a disable signal to disable said power supply, thereby substantially removing said AC voltage from said set of output terminals; and sensor means connected in circuit between said power line and said power supply and operative to provide said disable signal to said disable means whenever there is a flow of relatively high frequency current between the power line and the power supply, said sensor means being non-responsive to the relatively low frequency currents flowing between the power line and the power supply in response to said line voltage;

whereby, if there is a flow of relatively high frequency current between said output terminals and the power line, as may result in response to said AC voltage, the power supply will be rendered disabled, thereby substantially removing said AC voltage from said output terminals.

2. The improvement of claim 1 and threshold means operative to cause said disable signal to be provided to said disable means only after said flow of relatively high frequency current has reached a pre-determined magnitude.

3. The improvement of claim 1 wherein said sensor means comprises a current transformer that is responsive to push-push currents flowing between the power supply and the power line, but non-responsive to push-pull currents flowing therebetween.

4. The improvement of claim 1 wherein said power supply comprises a self-oscillating inverter of a type that has to be triggered into oscillation, and where said disable means is operative, upon receipt of said disable signal, to stop said inverter from oscillating;

whereby, after having been disabled by said disable signal, the inverter will not resume oscillations until is it re-triggered.

5. A ballast for a gas discharge lamp, said ballast adapted to be powered from the relatively low frequency line voltage on an electric utility power line and to power said lamp with a relatively high frequency AC voltage, said line voltage being provided at a set of input terminals and said AC voltage being provided at a set of output terminals, said ballast comprising:

frequency converter means connected in circuit with said input terminals and operative to provide said AC voltage at said output terminals;

connect means operable to connect said lamp with said output terminals;

disable means operable on the receipt of a disable signal to disable said converter means, thereby substantially removing said AC voltage from said output terminals; and sensor means connected in circuit with said input terminals and operative to provide said disable signal to said disable means whenever there is a flow of relatively high frequency current between the power line and the converter means, said sensor means being non-responsive to the relatively low frequency current flowing therebetweeen in response to said line voltage;

whereby, if there is a flow of relatively high frequency current between said output terminals and the power line, the converter means will be rendered disabled, thereby substantially removing said AC voltage from said output terminals.

6. The ballast of claim 5 and threshold means operative to cause said disable signal to be provided to said disable means only after said flow of relatively high frequency current has exceeded a certain magnitude.

7. The ballast of claim 5 wherein said sensor means comprises a current transformer connected in circuit between the power line and the converter means, said transformer being responsive to push-push currents flowing therebetween but not to push-pull currents flowing therebetween.

8. The ballast of claim 5 wherein said converter means comprises a self-oscillating inverter of a type that has to be triggered into oscillation, and where said disable means is operative, upon receipt of said disable signal, to stop said inverter from oscillating;

whereby, after having been disabled by said disable signal, the inverter will not resume oscillations until it is re-triggered.

9. In a ballast for a gas discharge lamp, said ballast adapted to be connected with and to be powered from the relatively low frequency line voltage on a regular electric utility power line, said ballast operative to power said lamp with a relatively high frequency AC voltage, with said AC voltage being provided at a set of output terminals, the improvement comprising:

disable means operable on the receipt of a disable signal to disable said ballast, thereby substantially removing said AC voltage from said output terminals; and sensor means connected in circuit between the power line and the ballast and operative to provide said disable signal to said disable means whenever there is a flow of relatively high frequency current between the power line and the ballast, said sensor means being non-responsive to the relatively low frequency currents flowing between the power line and the ballast in response to said line voltage;

whereby, if there is a flow of relatively high frequency current from said output terminals and to the power line, the ballast will be rendered disabled, thereby substantially removing said AC voltage from said output terminals.

10. The improvement of claim 9 wherein said sensor means comprises a current transformer responsive to a net current flowing between the power line and the ballast, but non-responsive to push-pull currents flowing therebetween.

11. The improvement of claim 9 wherein said disable means comprises a threshold means operative to prevent said disable signal to cause disabling of said ballast except if said disable signal reaches a certain magnitude.

12. The improvement of claim 9 wherein said ballast comprises a self-oscillating inverter of a type that has to be triggered into oscillation, and where said disable means is operative, upon receipt of said disable signal, to stop said inverter from oscillating;

whereby, after having been disabled by said disable signal, the inverter will not resume oscillation until it is re-triggered.

* * * * *